United States Patent [19]

Hoss et al.

[11] 4,141,869

[45] Feb. 27, 1979

[54] HEAT-SEALING THERMOPLASTIC ADHESIVE

[75] Inventors: Georg Hoss, Meckenheim; Eduard de Jong, St. Augustin, both of Fed. Rep. of Germany

[73] Assignee: Plate Bonn Gesellschaft mit beschrankter Haftung, Bonn, Fed. Rep. of Germany

[21] Appl. No.: 727,512

[22] Filed: Sep. 28, 1976

[30] Foreign Application Priority Data

Oct. 14, 1975 [DE] Fed. Rep. of Germany ....... 2545874

[51] Int. Cl.$^2$ .................. C08L 77/00; C08K 5/54; C08J 69/44
[52] U.S. Cl. .............. 260/29.15 B; 8/115.6; 8/DIG. 1; 260/30.8 R; 427/195; 427/322; 427/323; 427/324; 428/261; 428/447; 528/323; 528/324; 526/3
[58] Field of Search ............... 260/29.15 B, 30.8 R, 260/46.5 R, 46.5 G; 8/115.6 R, DIG. 1; 428/447, 261

[56] References Cited

U.S. PATENT DOCUMENTS

| | | | |
|---|---|---|---|
| 2,937,230 | 5/1960 | Rogers | 260/827 |
| 3,032,438 | 5/1962 | Gaynes et al. | 428/261 |
| 3,884,858 | 5/1975 | Morawetz | 260/824 R |
| 3,909,475 | 9/1975 | Schneider | 260/29.15 B |
| 3,919,438 | 11/1975 | Urkevich | 428/447 |
| 3,926,885 | 12/1975 | Keil | 260/29.15 B |
| 3,929,704 | 12/1975 | Horning | 428/447 |
| 3,935,154 | 1/1976 | Cawley | 260/824 R |
| 3,936,578 | 2/1976 | Dumoulin et al. | 260/29.15 B |
| 3,950,297 | 4/1976 | Raabe et al. | 260/30.8 R |
| 3,959,203 | 5/1976 | Keil | 260/29.15 B |
| 3,962,519 | 6/1976 | Rusch et al. | 428/447 |
| 3,965,057 | 6/1976 | Ammons et al. | 260/29.15 B |
| 3,975,351 | 8/1976 | Etchells | 260/30.8 R |
| 4,011,189 | 3/1977 | Keil | 260/29.15 B |
| 4,016,328 | 4/1977 | Horning | 260/29.15 B |
| 4,052,495 | 10/1977 | Uhlmann et al. | 260/824 R |

FOREIGN PATENT DOCUMENTS 2439735  3/1975  Fed. Rep. of Germany ........... 427/195

Primary Examiner—Herbert J. Lilling
Attorney, Agent, or Firm—Donald D. Jeffery

[57] ABSTRACT

This invention provides a heat-sealing thermoplastic adhesive of a thermoplastic polymer which is resistant to washing and dry-cleaning, which contains from about 0.05 to about 5% by weight, based on the weight of said polymer, of at least one hydrophobic silicone compound.

The invention further provides a process for heat-sealing a substrate which has been at least partly hydrophobized with a silicone compound, which comprises the steps of coating with a heat-sealing thermoplastic adhesive of a thermoplastic polymer which is resistant to washing and dry-cleaning and which contains from about 0.5 to about 5% by weight, based on the weight of said polymer, of at least one hydrophobic silicone compound, sintering, fixing and heat-sealing.

The adhesives according to the invention are useful for the bonding of substrates which have been hydrophobically finished with silicone compounds, such as raincoat fabrics.

12 Claims, No Drawings

HEAT-SEALING THERMOPLASTIC ADHESIVE

FIELD OF THE INVENTION

This invention relates to a heat-sealing thermoplastic adhesive of thermoplastic polymers which are resistant to washing and dry cleaning.

BACKGROUND OF THE INVENTION

It is known that heat-sealing thermoplastic adhesives based in particular on copolyamides, copolyesters or polyurethanes can be used for bonding purposes, more especially for bonding textile substrates (front fixing). These adhesives have to be processible at temperatures of from about 100° to 170° C and are required to develop strong adhesion with respect to any type of substrate to be bonded, more especially textile substrates. The adhesion which they develop is required to remain substantially intact under the stresses of, for example, washing and dry cleaning. Outstanding significance in this field has been acquired by copolyamides containing from 80 to 20% by weight of the basic unit, lauric lactam, and correspondingly from 20 to 80% by weight of the basic unit of one or more other polyamide-forming materials as described in German Auslegeschrift No. 1,253,449. Copolyamides which can be processed at particularly low temperatures contain from 25 to 35% by weight of caprolactam, from 20 to 40% by weight of lauric lactam, from 8 to 25% by weight of hexamethylene diamine adipate and from 10 to 40% by weight of the hexamethylene diamine salt of the acid of formula I

$$HOOC-(CH_2)_n-COOH \qquad I$$

in which n = 7, 8, 10 or 11 (as described in German Offenlegungsschrift No. 2,324,159), or 30% by weight of caprolactam, from 30 to 35% by weight of lauric lactam, from 10 to 15% by weight of hexamethylene diamine adipate or from 15 to 35% by weight of the hexamethylene diamine salt of the acid of formula I (as described in German Offenlegungsschrift No. 2,324,159) in co-polymerised form as basic units. Copolyesters and polyurethanes are also known as thermoplastic adhesives (as described in U.S. Pat. No. 3,669,921 and German Offenlegungsschrift No. 1,930,340 and 1,769,482).

Known thermoplastic adhesives based on copolyamide, copolyesters and polyurethane, in particular those based on copolyamide, develop satisfactory adhesion with respect to numerous interlining and outer fabrics of the type used in the clothing industry and retain this adhesion without significant losses even after washing or after dry cleaning. It is this factor which is responsible for the hitherto unexpected use of, in particular, copolyamides for front fixing. However, the level of adhesion developed by thermoplastic adhesives based on the polymers described above with respect to outer fabrics which are hydrophobically finished with silicone compounds, for example raincoat fabrics of polyester or polyester-cotton mixtures, are far from satisfactory, especially after dry cleaning, so that these polymers are unsuitable for this purpose.

An object of this invention is to provide a heat-sealing thermoplastic adhesive which is suitable for the heat-sealing of substrates which have been hydrophobically treated, more especially with silicone compounds.

SUMMARY OF THE INVENTION

The present invention relates to a heat-sealing thermoplastic adhesive of a thermoplastic polymer which are resistant to washing and dry cleaning, which contains from about 0.05 to about 5% by weight, based on the weight of the polymer, of at least one hydrophobic silicone compound.

It is extremely surprising that the heat-sealing thermoplastic adhesive according to the invention should develop outstanding adhesion in the bonding of substrates which have been hydrophobically treated, for example with silicones, such as raincoat fabrics, etc. The adhesion which they develop remains intact, even after repeated dry cleaning and after washing. This is all the more surprising insofar as hydrophobic silicone compounds are incompatible with organic high polymers and, as shown by the comparison tests described hereinafter, silicone compounds have an anti-adhesive effect, i.e. prevent adequate adhesion, in the bonding of substrates with conventional heat-sealing adhesives. Surface coating of the thermoplastic heat-sealing adhesives with silicone compounds would normally have been expected to produce the effect whereby, after heat sealing, adhesion is even weaker than the level of adhesion obtained with conventional thermoplastic adhesives in the bonding of substrates treated with hydrophobic silicone compounds.

In the context of the invention, suitable thermoplastic polymers are any polymers of the type which are already used for the heat-sealing of textiles. Preferred thermoplastic polymers are the polymers mentioned in the acknowledgement of the prior art and, for example, copolyamides of polyamide-forming amide salts containing at least 10 carbon atoms, polyamide-forming ω-amino acids and/or polyamide-forming lactams; crystallisable copolyesters based on terephthalic acid/diol; and thermoplastic polyurethanes.

The polymers may contain plasticisers. This applies in particular to copolyamides. Suitable plasticisers are, for example, sulphonic acid derivatives corresponding to the formula:

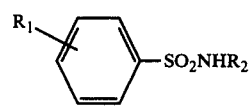

in which $R_1$ represents a group selected from the group consisting of hydrogen and methyl and $R_2$ represents a group selected from the group consisting of hydrogen, lower alkyl groups and the cyclohexyl group.

Benzene and toluene sulphonic acid ethylamides are particularly preferred. Corresponding commercial products are available. These commercial products are, for example, mixtures of p- and o-toluene sulphonic acid alkylamides. Phenol carboxylic acid and its alkyl esters may also be used as plasticisers. Examples of plasticisers of this type are butyl-p-hydroxy benzoate, lauryl-p-hydroxy benzoate, p-hydroxy benzoic acid and octyl-p-hydroxy benzoate. Bisphenol A and similar compounds may also be used as plasticisers. It is, of course, necessary to use plasticisers which are compatible with and suitable for the particular copolyamides used, as already known to the expert. The plasticisers may be worked into the copolyamides by mixing them with the copolyamides and heating the resulting mixtures to temperatures above the melting temperature. At these temperatures, they may be extruded for example to produce suitable shaped articles such as filaments, film and the like.

In general, the plasticiser may be used in a quantity of up to about 50% by weight of the total quantity of polymer and plasticiser. The plasticiser is preferably used in a quantity of up to about 25% by weight, based on the total quantity of polymer and plasticiser.

The polymers may contain dyes or other standard additives, for example antioxidants, fire-retarding agents and, in particular, optical lighteners and fluorescent agents. A large number of these agents which are available as commercial products are known to the expert. It is of course necessary to use additives which are stable at the heat-sealing temperatures applied.

According to the invention, the preferred hydrophobic silicone compounds are the compounds normally used for the hydrophobic finishing of textiles. The compounds in question are preferably the so-called silicone oils. Silicone oils are hydrophobic liquids with viscosities of from about 0.65 to 1 million centistokes (cf. German Auslegeschrift No. 1,075,550). Suitable silicone compounds are, in particular, organosilicon polymers or oligomeric compounds with Si—C bonds, such as polyorganosiloxanes or silicones, polysilalkylenes or polysilarylenes and polyorganosilazanes. Compounds containing Si—H groups are preferred. It is also possible to use polymeric or oligomeric organosilicates containing Si—O—C bonds, such as polyorganooxysiloxanes.

Products of this type are commercially available, for example under the name HYDROFUGEANT 20 218, from Rhone-Poulenc-Chemie, Frankfurt, and under the name Silikonoel ZG 318 from Th. Goldschmidt AG, Essen. Mixtures of different silicone compounds may be used.

The quantity in which the hydrophobic silicone compounds are used amounts to between about 0.05 and about 5% by weight and preferably to between about 0.5 and about 3% by weight, based on the weight of the polymer. In general, excellent results are obtained with about 1 to 2% by weight of hydrophobic silicone compounds. This quantity is sufficient for obtaining the required effect. The use of larger quantities is generally undesirable because it is not economical. A certain effect is, of course, still obtained even in cases where quantities above 5% by weight or below 0.05% by weight are used. The exact quantity may optionally be adapted to the particular application contemplated, which may be determined by a few simple preliminary tests.

The heat-sealing thermoplastic adhesives are best produced by coating the surface of the thermoplastic plastic with the above-mentioned silicone compounds. However, it is also possible to compound the silicone compounds into the heat-sealing thermoplastic adhesive. In cases where it is desired to compound the silicone compound into the heat-sealing thermoplastic adhesive, the silicone compound is best uniformly distributed in the molten adhesive which is then cooled and converted into the required three-dimensional form.

It is also possible to apply the silicone compound to a known thermoplastic polymer for heat sealing which, in accordance with the prior art, has already been applied to a non-hydrophobised substrate, for example an interlining. This may be done, for example, by guiding the interlining, coated for example with powder, through a pair of rolls and wetting the upper roll, which comes into contact with the heat-sealing thermoplastic adhesive, with the silicone compound so that the silicone compound is transferred to the heat-sealing thermoplastic adhesive, for example by a swash process. The interlining may then be heat-sealed with another substrate which has been hydrophobically finished to obtain strong adhesion. As in the prior art, preferred heat sealing adhesives are powders, preferably with a grain size of less than about 500 $\mu$, more preferably less than about 200 $\mu$. However, the thermoplastic adhesive may also be used in the form of films, filaments, optionally cut to a short length, granulates, networks, woven structures, etc. In cases where the heat-sealing adhesive is produced in the form of a powder, the powder of the thermoplastic plastic is preferably mixed with the silicone compound in a suitable mixer so that the silicone compound is uniformly distributed over the surface of the power.

The invention, further provides a process for heat-sealing substrates, especially textiles, leather or skins, which have been at least partly hydrophobised with silicone compounds, by coating with a heat-sealing thermoplastic adhesive as defined above, sintering, fixing and heat-sealing.

After heat-sealing, hardening occurs on cooling to room temperature, accompanied by joining of the bonded substrates.

The thermoplastic adhesive according to the invention may be applied in the form of a powder to a substrate to be bonded by means of, for example, a powder applicator of the type normally used in the coating industry. It is also possible to provide only a selected surface area of the substrate with the adhesive. Examples of substrates suitable for bonding are textile materials of natural and/or synthetic materials, such as wool, silk, cotton and polyesters, polyamides and the like. The excellent properties of the thermoplastic adhesive according to the invention are particularly apparent in the bonding of substrates which have been hydrophobically silicone with silicone compounds, such as raincoat fabrics, etc.

Other substrates, such as leather, plastics films and the like may also be heat-sealed in accordance with the invention.

The invention will now be further described with reference to the following non-limiting Examples.

SPECIFIC EMBODIMENTS

EXAMPLE 1

100 parts by weight of a standard commercial-type thermoplastic adhesive for the washing-resistant and dry-cleaning-resistant bonding of textile substrates based on copolyamides 6, 66 and 12 (PLATAMID H 105, a product of Plate Bonn GmbH: melting range 115° – 125° C, melt index 4 g/10 mins at 160° C according to DIN 53 735), in the form of a powder with a grain size range from 0 to 200 $\mu$, were coated in an intensive mixer with 1 part by weight of a standard commercial-type silicone oil (HYDROFUGEANT 20 218, a product of Rhone-Poulenc-Chemie, Frankfurt). By means of a powder spot-printing machine (CARATSCH-type, Bremgarten, Switzerland), the powder was then spot-printed through an 11-mesh screen onto an interlining of the type normally used in the clothing industry in a coating weight of 20 - 21 g/m² and sintered in a heating tunnel. The procedure adopted for this purpose is described, for example, by S. Schaaf in Textilveredlung 9, (1974), page 19. The interlining had a weight per square meter of approximately 110 g/m² and consisted of 100% cotton in the warp direction and 100% rayon in the weft direction.

The coated interlining was then ironed with a standard, heavily siliconised raincoat material of 65% of DIOLEN polyester and 35% of cotton with a weight of 165 g/m² (NINOFLEX 14 916, a product of NINO AG, Nordhorn) under a pressure of 350 g/cm² and with a temperature/time program in an electrical press heated on one side of the type commonly used in the clothing industry.

5 cm wide strips were cut from the composite material thus produced and subjected to a separation test in a tension tester. The bond strength values obtained are shown in Table 1. The composite material was also dry cleaned 5 times, after which bond strength was again measured.

EXAMPLE 2

In the thermoplastic adhesive described in Example 1, the quantity of silicone oil added was increased to 1.5 parts by weight. The bond strength values obtained with the thermoplastic adhesive thus modified are shown in Table 1.

EXAMPLE 3

100 parts by weight of the copolyamide powder used in Example 1 were mixed with 1 part by weight of a standard commercial-grade silicone "Silikonoel ZG 318" (a product of TH. Goldschmidt AG, Essen) and used for bonding under the same conditions as in Example 1.

The bond strengths obtained are shown in Table 1.

COMPARISON EXAMPLE

By way of comparison, the copolyamide powder used in Examples 1, 2 and 3 was applied to the interlining without any addition of silicones and ironed onto the raincoat material. The bond strengths obtained are shown in Table 1.

EXAMPLE 4

100 parts by weight of a standard commercial-grade copolyamide based on 6/12 and of a cycloaliphatic polyamide-forming monomer (PLATAMID-H 104, a product of Plate Bonn GmbH; melting range 125° - 135° C; melt index 17 g/10 mins at 160° C) were mixed with 1 part by weight of the silicone oil of Example 1 and subjected to the adhesion test described in that Example. The bond strengths obtained by comparison with unmodified copolyamide are shown in Table 2.

EXAMPLE 5

The following Examples show that the adhesion-increasing effect of silicone oils in the bonding of silicone-treated materials is not limited to copolyamides.

100 parts by weight of a standard commercial-type saturated copolyester based on terephthalic acid, 1,4-butane diol and 1,6-hexane diol (melting range 115° - 125° C; melt index 22 g/10 mins at 160° C), in the form of a powder with a grain size range from 0 to 200 μ, were mixed with 1 part by weight of the silicone compound mentioned in Example 1. The adhesion test carried out under the conditions already described produced the bond strengths shown in Table 2.

EXAMPLE 6

100 parts by weight of a powder-form thermoplastic polyurethane with a grain size of from 0 to 200 μ were homogeneously mixed with 1 part by weight of the silicone compound mentioned in Example 1. An adhesion test carried out in the same way as before produced the bond strengths shown in Table 2.

TABLE 1

| Example | Additive | Conditions of the ironing press[1] | Bond Strength[2] (kp/5 cm) normal | after dry cleaning 5 times |
|---|---|---|---|---|
| Example 1 | 1 % of hydro-fugeant 20 218 | 150/15 | 1.9 | 1.8 |
| | | 150/18 | 2.5 | 1.8 |
| | | 150/13+5 D | 3.1 | 2.5 |
| Copolyamide, quantity by weight applied 20–21 g/m² | | 160/15 | 2.5 | 2.1 |
| | | 160/18 | 1.9 | 2.3 |
| | | 160/13+5 D | 3.2 | 3.0 |
| Example 2 | 1.5 % of hydro-fugeant 20 218 | 150/15 | 1.5 | 1.6 |
| | | 150/18 | 1.6 | 1.7 |
| | | 150/13+5 D | 3.2 | 2.4 |
| Copolyamide, quantity by weight applied 21–22 g/m² | | 160/15 | 2.3 | 1.7 |
| | | 160/18 | 2.1 | 1.9 |
| | | 160/13+5 D | 3.0 | 3.0 |
| Example 3 | 1 % of Silikonoel ZG 318 | 150/15 | 2.2 | 1.7 |
| | | 150/18 | 2.6 | 2.1 |
| | | 150/13+5 D | 3.0 | 2.7 |
| Copolyamide, quantity by weight applied 19–20 g/m² | | 160/15 | 2.2 | 1.7 |
| | | 160/18 | 2.2 | 2.2 |
| | | 160/13+5 D | 2.9 | 2.4 |
| Comparison Example | none | 150/15 | 0.7 | n.m. |
| | | 150/18 | 0.7 | n.m. |
| | | 150/13+5 D | 1.1 | n.m. |
| Copolyamide, quantity by weight applied 19–20 g/m² | | 160/15 | 0.7 | n.m. |
| | | 160/18 | 0.7 | n.m. |
| | | 160/13+5 D | 1.6 | n.m. |

See remarks following Table 2

TABLE 2

| Example | Additive | Conditions of the ironing press[1] | Bond strength[2] (kp/5 cm) normal | after dry cleaning 5 times |
|---|---|---|---|---|
| Example 4 copolyamide; quantity by weight applied approx. 23 g/m²) | 1 % of hydro-fugeant 20 218 | 150/15 | 2.4 | 2.0 |
| | | 150/18 | 2.6 | 2.2 |
| | | 150/13+5 D | 3.4 | 3.0 |
| | | 160/15 | 2.6 | 2.4 |
| | | 160/18 | 2.3 | 2.6 |
| | | 160/13+5 D | >3.5 | 2.7 |
| | none | 150/15 | 1.1 | n.m. |
| | | 150/18 | 1.2 | n.m. |
| | | 150/13+5 D | 2.5 | n.m. |
| | | 160/15 | 1.4 | n.m. |
| | | 160/18 | 1.2 | n.m. |
| | | 160/13+5 D | 2.0 | n.m. |
| Example 5 copolyester; quantity by weight applied 20 g/m² | 1 % of hydro-fugeant 20 218 | 150/15 | 1.8 | 1.6 |
| | | 150/18 | 1.9 | 1.7 |
| | | 160/15 | 1.7 | 1.5 |
| | | 160/18 | 1.8 | 1.7 |
| | none | 150/15 | 0.5 | 0.5 |
| | | 150/15 | 0.5 | 0.5 |
| | | 160/15 | 0.5 | 0.5 |
| | | 160/18 | 0.5 | 0.6 |
| Example 6 polyurethane; quantity by weight | 1 % of hydro-fugeant 20 218 | 150/15 | 0.3 | 0.5 |
| | | 150/18 | 0.4 | 0.6 |
| | | 160/15 | 0.3 | 0.5 |

TABLE 2-continued

| Example | Additive | Conditions of the ironing press[1] | Bond strength[2] (kp/5 cm) | |
|---|---|---|---|---|
| | | | normal | after dry cleaning 5 times |
| applied approx. 20 g/m² | none | 160/18 | 0.4 | 0.6 |
| | | 150/15 | 0.2 | 0.2 |
| | | 150/18 | 0.2 | 0.2 |
| | | 160/15 | 0.2 | 0.2 |
| | | 160/18 | 0.2 | 0.2 |

Remarks:
[1]
150 : temperature setting of the ironing press (platen temperature) at 150° C
15 : pressing time 15 seconds
13+5 D : pressing time 13 seconds dry followed by steaming for 5 seconds
n.m. : not measured; bond strengths too low
[2] The bond strength values are averages taken from 10 tests.

We claim:

1. A heat-sealing thermoplastic adhesive of a thermoplastic polymer which is resistant to washing and dry-cleaning, selected from the group consisting of
   (a) copolyamides containing about 80 to 20% by weight of lauric lactam and 20 to 80% by weight of at least one other polyamide forming material;
   (b) copolyamides containing 25 to 35% by weight of caprolactam; 20 to 40% by weight of lauric lactam; 8 to 25% by weight of hexamethylene diamine adipate and from 10 to 40% by weight of the hexamethylene diamine salt of the acid of formula I, HOOC—(CH$_2$)$_n$—COOH in which n = 7, 8, 10 or 11;
   (c) copolyamides containing 30% by weight of caprolactam; 30 to 35% by weight of lauric lactam and 10 to 15% by weight of hexamethylene diamine adipate;
   (d) a copolyamides containing 30% by weight of caprolactam; 30 to 35% by weight of lauric lactam; and 15 to 35% by weight of the hexamethylene diamine salt of the acid of formula I;
   (e) copolyamides of a polyamide-forming amide salt containing at least 10 carbon atoms, a polyamide forming w-amino acid and, optionally, a polyamide forming lactam;
   (f) copolyamides of a polyamide-forming amide salt containing at least 10 carbon atoms and a polyamide-forming lactam and crystallisable copolyesters based on terephthalic acid/diol;

which contains from about 0.05 to about 5% by weight, based on the weight of said polymer, of at least one hydrophobic organosilicon polymer selected from the group consisting of polyorganosiloxanes, silicones, polysilalkylenes, polysilarylenes, polyorganosilazanes and polyorganooxysiloxanes.

2. Adhesive according to claim 1 which contains up to about 50% by weight of plasticizer, based on the total quantity of polymer and plasticizer.

3. Adhesive according to claim 2, which contains up to 25% by weight of plasticiser, based on the total quantity of polymer and plasticizer.

4. Adhesive according to claim 2 wherein said plasticizer is a sulphonic acid derivative of formula

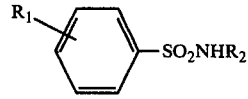

wherein R$_1$ represents a group selected from the group consisting of hydrogen and methyl and R$_2$ represents a group selected from the group consisting of hydrogen, lower alkyl groups and the cyclohexyl group.

5. Adhesive according to claim 4 wherein said plasticizer is benzene sulphonic acid ethylamide.

6. Adhesive according to claim 4 wherein said plasticizer is toluene sulphonic acid ethylamide.

7. Adhesive according to claim 2 wherein said plasticizer is phenol carboxylic acid.

8. Adhesive according to claim 2 wherein said plasticizer is a phenol carboxylic acid alkyl ester.

9. Adhesive according to claim 8 wherein said plasticizer is an ester selected from the group consisting of butyl-p-hydroxy benzoate; lauryl-p-hydroxy benzoate; p-hydroxy benzoic acid and octyl-p-hydroxy benzoate.

10. Adhesive according to claim 1 wherein said hydrophobic silicone compound is a silicone oil having a viscosity from about 0.65 to 1 million centistokes.

11. Adhesive according to claim 1 wherein said hydrophobic silicone compound is used in a quantity of from about 0.5 to 3% by weight, based on the weight of the polymer.

12. Adhesive according to claim 1 wherein said hydrophobic silicone compound is used in a quantity of from about 1 to 2% by weight.

* * * * *